US008756586B2

(12) United States Patent
Khanapurkar et al.

(10) Patent No.: US 8,756,586 B2
(45) Date of Patent: Jun. 17, 2014

(54) SYSTEM AND METHOD FOR AUTOMATED PERFORMANCE TESTING IN A DYNAMIC PRODUCTION ENVIRONMENT

(75) Inventors: Amol Khanapurkar, Mumbai (IN); Omkar Parab, Mumbai (IN); Suresh Malan, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 371 days.

(21) Appl. No.: 12/964,759

(22) Filed: Dec. 10, 2010

(65) Prior Publication Data
US 2011/0145795 A1  Jun. 16, 2011

(30) Foreign Application Priority Data
Dec. 10, 2009  (IN) .......................... 2844/MUM/2009

(51) Int. Cl.
*G06F 9/44* (2006.01)
(52) U.S. Cl.
USPC ........................................................ 717/130
(58) Field of Classification Search
USPC ......... 717/126, 101, 103, 106, 130; 714/38.1, 714/46, 47.2; 709/223, 230, 224; 715/736; 705/2, 7.39; 702/186; 703/13; 707/999.002
See application file for complete search history.

(56) References Cited

U.S. PATENT DOCUMENTS

| | | | |
|---|---|---|---|
| 6,405,364 B1 * | 6/2002 | Bowman-Amuah | 717/101 |
| 6,735,719 B2 | 5/2004 | Moe et al. | |
| 6,799,147 B1 | 9/2004 | Balasubramanian et al. | |
| 7,155,428 B1 * | 12/2006 | Brown et al. | 1/1 |
| 7,290,048 B1 * | 10/2007 | Barnett et al. | 709/223 |
| 7,415,635 B1 | 8/2008 | Annangi | |
| 7,457,723 B2 | 11/2008 | Zhu et al. | |
| 7,493,272 B2 | 2/2009 | Chen et al. | |
| 7,577,875 B2 | 8/2009 | Nelson et al. | |
| 2003/0065986 A1 * | 4/2003 | Fraenkel et al. | 714/47 |
| 2005/0216488 A1 * | 9/2005 | Petrov et al. | 707/100 |
| 2007/0083631 A1 * | 4/2007 | Maccaux | 709/223 |
| 2007/0294660 A1 * | 12/2007 | Chong et al. | 717/103 |
| 2010/0153529 A1 * | 6/2010 | Moser | 709/223 |

OTHER PUBLICATIONS

Ioszpe, "Network Testing with Shunra's STORM", STQE, Jan. 2001, 2 pages.*
JPROF, "Java Profiler", Feb. 2009, 8 pages.*

* cited by examiner

*Primary Examiner* — Tuan A Vu
(74) *Attorney, Agent, or Firm* — Akerman LLP; Peter A. Chiabotti; Roy P. Zachariah

(57) ABSTRACT

The present invention relates to a system and method for automated performance testing in a dynamic production environment. More particularly the present invention relates to an automated system that enables the determination of whether a software application can meet the scalability and performance requirements in a real time use environment, wherein the performance requirement test comprises test for workload, reliability and resource usage. The system of the present invention provides an automated system for performing testing method that can convert a static environment i.e. fixed workload, one application state and one hardware representation into a dynamic one and predict accurate performance results for said constantly changing application. The system enables less effort, time and consequently money, and meets the performance scalability and requirements in real-time.

16 Claims, 7 Drawing Sheets

Top Pages Keeping Server Busy

| | Appl Server | | | | |
|---|---|---|---|---|---|
| Transaction | Response Time (sec) | Processing Time (sec) | Network Overhead (sec) | Request Send Time (sec) | Client Delay (sec) |
| GET./perc_crm/GetSupplierOrders.jsp. | 0.9 | 0.9 | 0 | 0 | 0 |
| POST./perc_crm/GetSolutions.jsp. | 0.83 | 0.83 | 0 | 0 | 0 |
| GET./perc_crm/GetManufacturerOrders.jsp. | 0.78 | 0.73 | 0.04 | 0 | 0 |
| POST./perc_crm/CreateJobCardServlet.do. | 0.15 | 0.15 | 0 | 0 | 0 |
| POST./perc_crm/CreateServiceCallServlet.do. | 0.12 | 0.12 | 0 | 0 | 0 |

Top Pages keeping Network Busy

| | Appl Server | | | | |
|---|---|---|---|---|---|
| Transaction | Response Time (sec) | Processing Time (sec) | Network Overhead (sec) | Request Send Time (sec) | Client Delay (sec) |
| GET./perc_crm/SupplierLinks.jsp. | 0.18 | 0.01 | 0.17 | 0 | 0 |
| GET./perc_crm/ManufacturerLinks.jsp. | 0.17 | 0 | 0.17 | 0 | 0 |
| GET./perc_crm/blank.html. | 0.09 | 0 | 0.09 | 0 | 0 |
| GET./perc_crm/Links.jsp. | 0.06 | 0.01 | 0.06 | 0 | 0 |
| GET./perc_crm/GetManufacturerOrders.jsp. | 0.78 | 0.73 | 0.04 | 0 | 0 |

FIG. 5

| Transaction | Successful Tests | Errors in Tests | Mean Test Time (sec) | Throughput (pages/sec) | Mean Response Length |
|---|---|---|---|---|---|
| Login_5 | 25 | 0 | 0.02 | 0.11 | 0 |
| GET Welcome.jsp | 25 | 0 | 0 | 0.11 | 226 |
| GET Masthead_left.jpg | 25 | 0 | 0 | 0.11 | 628 |
| GET Masthead_center.jpg | 25 | 0 | 0 | 0.11 | 185 |
| GET Masthead_center.jpg | 25 | 0 | 0 | 0.11 | 185 |
| GET Masthead_right.jpg | 25 | 0 | 0 | 0.11 | 497 |
| GET eQuiz.css | 25 | 0 | 0 | 0.11 | 911 |
| GET quiz.jpg | 25 | 0 | 0 | 0.11 | 174 |
| GET ClientSide_Validations.js | 25 | 0 | 0 | 0.11 | 6622 |

SYSTEM AND METHOD FOR AUTOMATED PERFORMANCE TESTING IN A DYNAMIC PRODUCTION ENVIRONMENT

CROSS REFERENCE TO RELATED APPLICATION

This application claims the benefits of Indian Patent Application No. 2844/MUM/2009, filed on Dec. 10, 2009, the contents of which are hereby incorporated by reference in its entirety.

FIELD OF THE INVENTION

The present invention relates to a system and method for automated performance testing of enterprise applications in a dynamic production environment. More particularly the present invention relates to an automated system that enables the determination of whether an enterprise application can meet the performance requirements in a real time use environment, wherein the performance requirement test comprises tests for workload, reliability and resource usage.

BACKGROUND OF THE INVENTION

Performance testing is a process used to ascertain if the software application can meet performance criteria namely, work-load, reliability, resource-usage, scalability and other requirements in a dynamic or real time use environment. Performance testing is a very important phase in software application development lifecycle, it can determine whether the software application qualifies the performance criteria and it can also determine the better application amongst two or more software applications available for a given purpose on the basis of the above mentioned performance criteria.

For many years, the conventional performance testing tools or system are comprised of load injectors, a system resource utilization measurement system and application monitoring tools or utilities.

Over the years, with the progress in technology, more advanced ways of performance testing techniques are developed that involve the distribution of user load across multiple systems, use of network bandwidth simulators supported by the load injection tool and does statistical profiling of application tier wherein, the resultant performance test result of such methods primarily consists of a function of: (1) Work-load—{Arrival, Activity and Departure Rates}; (2) Application State—{Data volumes, Impact of one component on another}; and (3) Resource Utilization—{Capacity of the underlying hardware}.

Such typical or advanced performance testing methodology is at best a bottleneck detection exercise, and a due diligence activity to anticipate which tiers needed more attention when launched into dynamic production environment.

It is further observed that in a performance test environment most of the performing test exercises are statically represented (Fixed workload, one application state and one hardware environment), whereas in real-life (after launch of the software and into Production) all of the above functions are in constant state of flux.

In Production stage, it is observed that due to factors like shared hosting, unanticipated application access patterns, growth in data volumes and integration with other applications have impact on performance.

Hence there is an urgent need for a solution that overcomes some of the existing lacunae in performance testing domain that are accounting, distinguishing and addressing the differences in static test environment and dynamic production environment; ensuring productivity while working from different locations; increased size of database in production environment as compared to test environment; scalability testing challenges with increased hardware and software costs; on time correct documentation of test results and predict the accurate results over a constantly changing application; integrating the performance testing system with the software development life cycle of legacy systems to leverage previous investments in terms of software and knowledge assets; performing extrapolation and validating results and the distribution of think times of load testing or enterprise performance testing challenges; and executing the right scripts with predetermined think times, scientifically computing run duration and validating the data provided by the load generators.

Some of the inventions which deal with providing a solution to performance testing are listed below. None of them address the lacunae stated above.

U.S. Pat. No. 7,577,875 discloses a system and method that generates a list of parts of a tested software program that are responsible for significant performance regressions in the tested software that may be ranked by significance. Further the system analyzes sampled profile data, which provides information about processor activity during a test. An amount of processor resources used to execute the various functions, modules, and processes of tested software can be determined.

U.S. Pat. No. 7,493,272 discloses a method of performance testing for software applications, wherein the electronic document is a web-page presented as part of a web-based shopping system.

U.S. Pat. No. 7,457,723 discloses a method for providing performance testing, the method comprising: performing N number of iterations of a test; determining that results of the test are valid if the test reached a defined test criteria after performing the N number of iterations; deeming the test as passing if the test results compare favorably to a goal value; and deeming the test as failing if the test results compare unfavorably to the goal value.

U.S. Pat. No. 7,415,635 discloses a method of testing a software application comprising: executing a test script that identifies the software application to be tested and a plurality of measurements.

U.S. Pat. No. 6,799,147 discloses a method for testing and monitoring applications, by providing at least one integrated interface capable of controlling at least two monitoring programs which each send functional test signals to respective applications and receive results functionally responsive to the test signals; wherein at least one of the monitoring programs sends test signals using HTTP-compliant communications; and wherein a second or the monitoring programs sends test signals using TCP/IP-compliant communications.

U.S. Pat. No. 6,735,719 discloses a method for performing a load test on a application software in which dynamic data are required to be correlated, said method comprising: recording a test script; identifying a location at which dynamic data are first generated within said recorded test script from a recording log; inserting proper data correlation statements into said recorded test script; substituting inserted data parameters throughout said recorded test scripts; verifying that all of said dynamic data have been captured and replaced; and performing a load test on a software application utilizing said recorded test script.

In order to address the need of such a solution, the present invention provides a resource efficient system having a scalable and pluggable framework and method for automated, cost effective performance testing in order to meet the performance and scalability requirements, bridge gap between dynamic production environment and static test environment, maximize coverage of performance testing engagement, provide insight on not just current but also latent performance defects which manifests as the system evolves and provides end-to-end visibility of performance metrics to help improve productivity by compressing test-tune iterations.

SUMMARY OF THE INVENTION

Before the present system is described, it is to be understood that this invention is not limited to particular methodologies, systems and hardware described, as these may vary as per the person skilled in the art. It is also to be understood that the terminology used in the description is for the purpose of describing the particular versions or embodiments only, and is not intended to limit the scope of the present invention.

The primary object of the present invention is to provide a resource efficient system and method for automated performance testing of enterprise applications in a dynamic production environment.

Another object of the invention is to provide a system, which performs the extrapolation and validation of the results.

Another object of the invention is to provide different distributions of think time to be used in performance testing which is currently being faced as a challenge by many enterprises.

Another object of the invention is to provide a system, which executes the right scripts with pre-determined think times, scientifically computes run duration and validates the data provided by the load generators.

Another object of the invention is to provide a system, which ascertains if an enterprise application can meet the performance and scalability requirements.

Another objective of the present invention is to provide a system for automated performance testing, which can transform a static test environment into a dynamic production environment and predict the accurate results over a constantly changing application environment.

Another objective of the present invention is to capture and provide quantitative performance metrics in an emulated or non-emulated production environment using profilers.

Another objective of the present invention is to maximize the coverage of performance testing by creating a holistic system by integrating multiple components together in a system as a whole.

Another objective of present invention is to provide insight on current performance defects as well as on the latent performance defects which may be manifested with evolution of system application.

Another objective of the present invention is to provide end-to-end visibility of performance metrics to improve productivity by compressing test-tune iterations.

Another objective of the present invention is to support conversion of one script format into another by use of script converter.

Another objective of the present invention is to provide a web enabled and collaborative approach, which makes sharing of hardware and software resources simple and cost effective.

Another objective of the present invention is to provide a system which integrates with custom load generation tools of legacy systems for running custom test harness in order to perform performance testing for an enterprise application.

Another object of the present invention is to provide a resource efficient and scalable framework which can cater to sizably high number of virtual users to be used in performance testing.

SUMMARY OF THE INVENTION

The present invention discloses a resource efficient system having a scalable and pluggable framework for automated performance testing of enterprise applications in a dynamic production environment.

The present invention implements a method for enabling automated performance testing of an enterprise application in a dynamic production environment by employing a resource efficient system having a scalable and pluggable framework; wherein the said method comprises the steps of: monitoring workload, response times, and throughput and resource utilization for the said application by means of a real-time test monitor; computing optimal run duration for the said application under test using a run duration module of the system; extrapolating results from a smaller load level of static test environment to a higher load level under saturation for dynamic production environment using a system modeling tool integrated with the said system; validating whether a right performance script is executed, whether the logs of one or more servers are correlated with the performance test results obtained, validate the response time information provided by the interconnected components of the system via a communication network comprising load generators, emulators and profilers; generating analytical data output for performance parameters by means of a reporting engine of the said enterprise application.

In a preferred embodiment of the present invention, the said method further comprises the steps of: recording, enhancing and replaying a performance test script for an input test data using one or more system supported load generators for subsequent execution of the said scripts; virtually establishing a real-time network gateway by using emulators integrated with the said system for transforming a static test environment into a dynamic production environment; detecting the bottleneck tiers across different tiers of an application by analyzing the break-up time spent across each tier by means of a transaction profiler; measuring method level response time and heap utilization statistics in order to capture performance metrics for the said application by means of a java profiler; retrieving the result data obtained using an agent and transmitting the said result data to one or more servers over a real-time communicating network.

In another embodiment, the present invention provides a method for enabling automated performance testing of an enterprise application in a dynamic production environment by employing a resource efficient system having a scalable and pluggable framework, comprising the steps of: monitoring network activity across a network using a real-time test monitor; extrapolating network activity data from a static test environment to a dynamic production environment using a system modeling tool; validating network activity data using at least one of a load generator, an emulator, and a profiler; and generating a performance output parameter using a reporting engine.

In another embodiment, the present invention provides a resource efficient system having a scalable and pluggable framework for automated performance testing of an enterprise application in a dynamic production environment, comprising: an agent coupled to a framework; a plurality of interconnected components communicatively coupled to the agent, the interconnected components comprising at least one of a load generator, an emulator, and a profiler; and a server communicatively coupled to a repository, a scheduler, a system modeling tool, a system resource utilization monitor, a run-time duration module, a real-time test monitor, and a reporting engine.

BRIEF DESCRIPTION OF DRAWINGS

The foregoing summary, as well as the following detailed description of preferred embodiments, is better understood when read in conjunction with the appended drawings. For the purpose of illustrating the invention, there is shown in the drawings, example constructions of the invention; however, the invention is not limited to the specific methods disclosed in the drawings:

FIG. 5 of the present invention illustrates the comprehensive test report data generated by the system of the present invention for transaction profiler for top 10 quiz application.

DETAILED DESCRIPTION OF THE INVENTION

Figure 1:
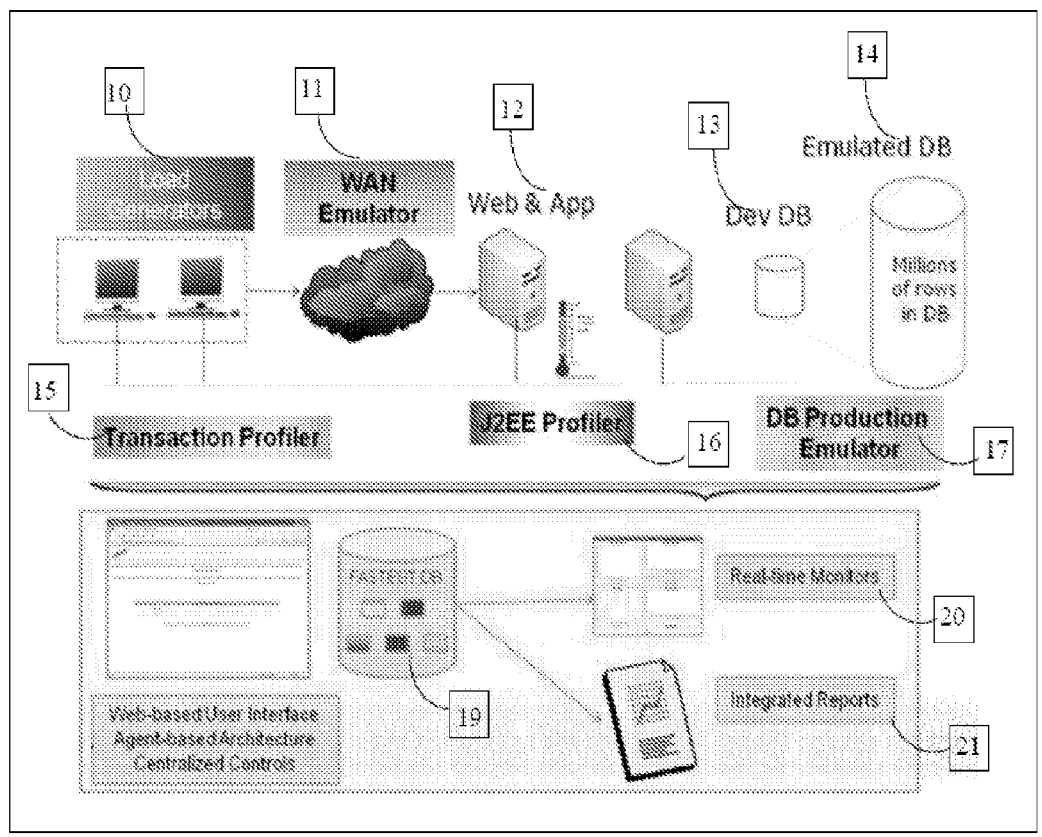
FIG. 1 of the present invention illustrates the architecture of the system for automated performance testing in a dynamic production environment.

Before the present method, system and communication enablement are described, it is to be understood that this invention is not limited to the particular methodologies, and hardware and network described, as these may vary within the specification indicated. It is also to be understood that the terminology used in the description is for the purpose of describing the particular versions or embodiments only, and is not intended to limit the scope of the present invention, which will be limited only by the appended claims. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. Further it is to be noted that the terms "performance testing" and "load testing" are interchangeable. Further terms "enterprise application" and "web application" are interchangeable. The disclosed embodiments are merely exemplary methods of the invention, which may be embodied in various forms.

In one of the embodiments, the present invention provides a system and method for automated performance testing in a dynamic production environment.

A resource efficient system having a scalable and pluggable framework for automated performance testing of an enterprise application in a dynamic production environment, wherein the said system comprises of: one or more agent interfaced with plurality of interconnected components via a communication network; wherein the said interconnected components further comprises of: one or more framework supported load generator integrated with the said framework by way of configuration of a wrapper on the performance script of the said load generator for recording, enhancing and replaying the said performance script for an input test data, one or more emulator integrated with the said framework to transform the static test environment into a dynamic production environment, and one or more profilers integrated with the said framework to capture performance metrics under emulated or non-emulated environments for the said data; one or more server for managing the data and providing a user interface; wherein the said server interactively communicates with: a repository for managing the inventory and mapping information associated with the said framework, a scheduler for scheduling a real-time test for the said enterprise application, a system modeling tool for extrapolating performance results from a smaller load level of static test environment to a higher load level under saturation for a dynamic production environment, a system resource utilization monitor for identifying demand on a particular hardware or software, a run-time duration module for computing optimal run duration of the said enterprise application under test, a real-time test monitor for monitoring the workload, response times, throughput and resource utilization, and a reporting engine for generating analytical data output for performance parameters.

In another embodiment of the present invention, the scalable and pluggable framework provides a holistic performance testing wherein lack of one of more of these tools such as but not limited to inter-connectable components, agents and server compromises the ability to address particular concern of performance testing whereas using any of these solutions as point solution compromises the productivity.

The system of the present invention further addresses performance and scalability concerns of many systems and applications integrated in the system of the present invention in order to enhance productivity.

FIG. 1 of the present invention illustrates the architecture of the system for automated performance testing in a dynamic production environment; wherein the said system of the present invention comprises of one or more agent interfaced with plurality of interconnected components within a communication network; one or more load generator integrated with the said system by way of configuration of a wrapper on the performance script of the said load generator for recording, enhancing and replaying the said performance script for an input test data; one or more emulator integrated with the said system to transform the static test environment into a dynamic production environment; one or more profilers integrated with the said system to capture performance metrics under emulated or non-emulated environments; one or more server for managing the input test data and providing a user interface; wherein the said server interactively communicates with: a repository for managing the inventory and mapping information associated with the said system, a scheduler for performing real-time tests at a pre-decided schedule, a system resource utilization monitor for identifying demand on a particular hardware or a software, a real-time test monitor for monitoring the workload, response times, throughput and resource utilization, a reporting engine a run time duration module for computing run duration for an enterprise application under test, and a framework supported performance modeling tools for extrapolation of performance results to transform small data from static test environment to large data from dynamic production environment.

The framework of the system of the present invention is a pluggable and scalable platform that can be used for performing performance testing of an enterprise application.

In a preferred embodiment of the present invention, the framework can be written as a web application running on a java or J2EE compliant application server and a RDBMS database/repository; wherein Tomcat and MySQL can be used as application and database servers.

The system of the present invention runs a software application or web based application 12 stored in a repository on a suitable communicating network such as but not limited to TCP/IP protocol, that can be captured and recorded in form of performance scripts.

According to one of the embodiments of the present invention, one or more agents of the system are interfaced with the interconnected components such as load generators 10, emulators, profilers and servers.

Further, these agents comprises of multiple adaptors for the interconnected components; wherein these multiple adaptors can run as a part of an agent.

In a preferred embodiment of the present invention, only one agent runs on one hardware server, only a given adaptor can run in the context of a given agent i.e. agent-adaptor pair is unique and individual adaptors need to be configured before they participate in a performance test. This is a one-time activity and is collected at agent installation time.

Further, a framework supported load generator 10 captures, records, enhances, configures the scenario for executing scripts and replays the performance scripts such that it generated load against the application under test to detect bottlenecks and identify tuning opportunities.

In a preferred embodiment of the present invention, configuration of the scenario for executing scripts comprises configuring the script to be run, the number of users, user think times, arrival rate, departure rate.

Framework supports two types of load generators 10 viz. commercial/open source load generators and custom load generators. Mainstream load generators such as HP LoadRunner, Microsoft VSTT (commercial) and The Grinder (open Source) are supported. The framework provides wrappers around performance scripts and configuration files generated by these load generators so that these can be used within the framework.

These wrappers are built by building adaptors which provide input test data and collect output from these load generators by providing compatibility between the user's system and the system of the present invention.

Further these wrappers distribute unequal number of virtual users and scripts to each participating user's system, distinguishes and identifies the scripts which runs slowly in the same scenario by numbering the scripts uniquely, generate Microsoft Word and PDF reports with data from load generators as well as other system components or tools. This data can be displayed in tabular and graphical format as applicable.

Further, the test compartment validates if load generator is configured or not. If the load generator is configured then, it activates the performance test, accesses controls, schedules test runs and manages the test data.

According to another embodiment of the present invention, the system integrates with custom load generation tools of legacy systems for running custom test harness; wherein method of implementation of processing output for a legacy system is provided as input to the system of the present invention. Further upon integration, the system provides data for custom load generator integrated into system of the present invention.

According to another embodiment of the invention, one or more emulators are integrated with the system to transform the static test environment into a dynamic production environment.

The emulators integrated with the system of the present invention comprise of WAN (Wide Area Network) emulator 11 and database production emulator 17.

WAN emulator 11, configured as a gateway network between two computer machines, captures network packets and feeds them to a mathematical model comprising of values for the characteristics such as but not limited to bandwidth, latency, packet loss, jitter, or connection losses.

Further, the WAN emulator 11 integrates with the system of the invention using Apache HTTP client library, which makes performance testing of web based or software application possible against different network conditions. The model shapes traffic such that it resembles to a real wide area network (WAN) in a LAN (Local Area Network) environment.

The WAN emulator 11, integrated into system is an open source tool/component released by Tata Consultancy Services.

Database Production Emulator 17, integrated in the system of the present invention, extracts query response time under large volumes of development repository 13 size without physically generating those large volumes of data, and hence provides a method to predict performance of a query for future volume of database emulated repository 14 from development repository 13. Database Production Emulator 17, further builds models based on IO-cost and CPU-cost, provided by repository servers.

Further, Database Production Emulator 17 is integrated into the system at two places namely; (1) Control level, where the system makes API (application programming interface) calls to send control signals to database production emulator 17 such as start, stop and collate data and (2) Data layer, which provides loose coupling between system and Database Production Emulator 17.

In a preferred embodiment of the present invention, the database production emulator 17, integrated into system is a tool/component as described in Indian patent application no. 2383/MUM/2007 with title "Field of Time Estimation for Structured Query Language (SQL) in Information Systems") filed by Tata Consultancy Services.

According to another embodiment of the present invention, one or more agents are interfaced with one or more profilers integrated with the said system to capture performance metrics under emulated or non-emulated environments.

The profiler integrated with the system is a low-overhead application performance measurement tool, which identifies the bottleneck tiers in the production environment of an application, by obtaining break-up of time spent across different tiers of a software application.

Profilers integrated in the system of present invention are transaction profiler 15 and Java or J2EE profiler 16.

Further, both the transaction profiler 15 and Java profiler are integrated into the system at two places namely; (1) Control level, where the system makes API calls to send control signals to the said profilers such as start, stop and collate data and (2) Data layer, which provides loose coupling between system and said profilers.

Transaction profiler 15 captures the network packets, identifies the protocol of the network packets and performs protocol analysis to keep track of requests and response details; whereas Java profilers 16 integrated in the system sustains large online transaction processing and captures performance metrics for a Java application by capturing method response time heap utilization statistics by working on principle of byte code instrumentation. It captures a method level response time at an overhead of 2-5 microseconds per head.

In a preferred embodiment of the present invention, the transaction profiler 15, integrated into system is a tool/component as described in Indian patent application no. 1574/MUM/2005 filed by Tata Consultancy Services.

In a preferred embodiment of the present invention, the Java profiler 16, integrated into system is an open source tool/component released by Tata Consultancy Services.

According to another preferred embodiment of the present invention, one or more servers integrated to the system manage the input test data and provides a user interface; wherein the said server interactively communicates with: a repository for managing the inventory and mapping information associated with the said system, a scheduler for performing real-time tests at a pre-decided schedule, a real-time test monitor for monitoring the workload, response times, throughput and resource utilization, and a reporting engine In a preferred embodiment of the present invention, the inventory and mapping information stored in the repository comprises of performance scripts and scenarios for applications as input test data, log files of one or more servers, test artifacts generated from load generators consisting of scripts, scenarios, and component generated data and test reports, software and hardware inventory information such as list of one or more servers and software components participating in performance tests and mapping a particular software running on a particular hardware.

The load generators collects, records, pools and correlates data and replays the input test data in the form of performance scripts and scenario uploaded by the user for their respective projects and further transfers these data to the server with the help of one or more agents.

Further, the scheduler runs the test. After every test run, all the components of the system create the test data. Some of the test data is transferred to open source repository 14 such as MySQL, whereas some of the test data i.e. log files is stored in the "file store repository" 19 managed by the automated system.

The load generators collects the test artifacts in the form of scripts, scenarios, component generated data from the agent and transfers it to the server using TCP/IP socket in real time through the component-specific adaptors.

The automated system then, processes these test artifacts and generates an integrated test report 21 for performance testing. Once all the data from all the components have been transferred to the server, the agent is freely made available for the next run.

The automated system further provides health of a test run in real time through real time test monitors 20, by depicting 4 things viz. workload, response times, and throughput and resource utilization. The graphical user interface of real-time test monitor for the results of the health of a test run is illustrated in details in FIG. 4.

In a preferred embodiment of the present invention, workload refers to the number of users accessing the application.

In another preferred embodiment of the present invention, response time is the time taken between the user making a request and receiving a response. This helps in identifying the responsiveness of the application.

In a further preferred embodiment of the present invention, throughput is measured in terms of transactions per unit time.

In a further preferred embodiment of the present invention, resource utilization monitoring identifies the demand on a particular hardware or software resource. Further, the hardware resource utilization monitoring of the system of the present invention comprises of monitoring central processing unit, memory and network.

According to another embodiment of the present invention, the system of the present invention incorporates the run duration module to provide a time-based or iteration based mechanism for deciding the run duration; wherein the performance testing components use the confidence intervals from the statistics obtained and use in discrete event simulation to compute optimal run duration.

According to another embodiment of the present invention, the system of the present invention supports conversion of one script format into another by use of script converter. The script converter performs the following tasks: (1) Language conversion, and (2) Feature conversion or data pooling from one language to another.

In a preferred embodiment language conversion task comprises of converting an interpreted C to C# and Jython, C# to interpreted C and Jython, Jython to interpreted C and C#.

In yet another preferred embodiments of the present invention, the system of the present invention further validates whether the right script is executed, whether the logs of one or more servers correlate with the performance test results obtained, validates the timing information provided by the components of the system.

The validation is carried out by the system using the little's law based validation methodology represented by the formula 1:

$$N=X(R+Z) \quad (1)$$

Where,
N=Number of users
X=Throughput
R=Average Response Time
Z=Think Time

Wherein the system considers the following values in the formula of little's law N=input by the user. The script and the configuration settings are used to determine Z, which is accessed by the system.
R=output by the components of the system; and
X=number of transactions completed (pages loaded) or run duration.

Yet another embodiment of the present invention, the system of the present invention models the system for dynamic production environment using modeling system tools and thereby automates the efforts and test process.

The existing test results are provided as input to the modeling system tools of the system. The data i.e. test results are further processed using little's law mathematical models and heuristics and the results are extrapolated from small loads of static test environment to large loads of dynamic production environment. The modeling system tool determines the maximum performance for a system by using simple results from bottleneck analysis.

Further, when a system is subjected to more load "N" increases and it reaches a point where the system throughput saturates, because some resource has hit a bottleneck and throughput does not increase unless the bottleneck is removed. Further, the modeling system tool of the present invention considers think time i.e. Z=0 and thereby causes the system throughput to saturate at a lower value of N than the realistic think times in order to slow down the bottleneck hits from the resource system.

Further, when the throughput under bottleneck conditions have a smaller N and Z, the modeling system tool integrated in the system of the present invention determines the response time under saturation for a realistic value of N and Z by using Little's Law wherein, limiting throughput or throughput under saturation is Xmax. According to Little's Law:

$$N = Xmax(R+Z) \text{ under saturation, or}$$

$$R = N/Xmax - Z \text{ for a saturated system} \quad (2)$$

Thereby, the system of the present invention obtains Xmax by using a lower value of N and Z and are using it in Little's Law at a higher value of N and Z as throughput will not increase beyond Xmax and thereby extrapolates small loads of static test environment to large loads of dynamic production environment without upgrading capacity or optimizing the system architecture, design and code.

In a preferred embodiment of the present invention, the modeling system tool integrated in the system of the present invention comprises of OpTier and Hyperformix.

According to another embodiment of the present invention, the system of the present invention supports exponential and hyper-exponential distributions of think times using the system supported load generators and libraries such as but not limited to java libraries, C library, C# library.

Thereby, the system of the present invention meets the scalability and performance requirements by optimizing the technology, test process automation and efforts i.e. script conversion, run duration, modeling system and think time distribution.

Further, the system of the present invention can be made scalable by catering to a sizably high number of users with low-response times and attaining a high throughput with low resource utilization numbers.

Figure 2:
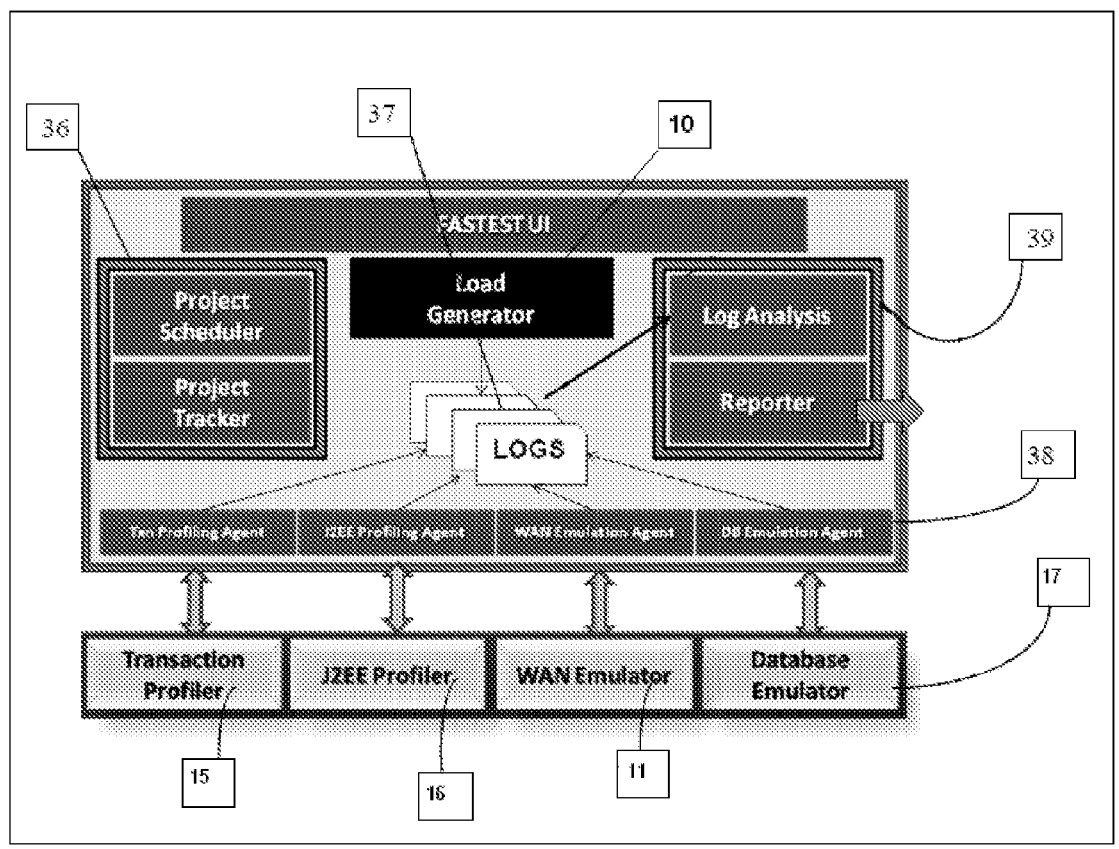
FIG. 2 of the present invention illustrates the logical architecture of the system for automated performance testing in a dynamic production environment.

FIG. 2 of the present invention illustrates the logical architecture of the system for automated performance testing in a dynamic production environment. The architecture comprises of a load generator 10, WAN emulator 11, and database production emulator 17, transaction profiler 15, and Java or J2EE profiler 16, project scheduler and tracker 36, log files 37, Agents 38 such as but not limited to transaction profiling agent, J2EE profiling agent, WAN emulation agent, database emulation agent; and log analysis and reporting engine or reporter 39.

The present invention performs a web based application on a suitable TCP/IP protocol, wherein, the system supported load generator (10) captures and records the performance scripts and enhances the script by data pooling and correlation as described in FIG. 1.

These load generators collects input i.e. test data from the user for their respective projects and transfers these data to the server with the help of one or more agents 38 such as but not limited to WAN emulator agent, Database emulator agent, J2EE profiling agent, transaction profiling agent.

These agents comprises of multiple adaptors for interconnected components such as WAN emulator (11), Database production emulator (17), transaction profiler (15), J2EE profiler (16), which can be run as a part of an agent. The agent-adaptor pair is unique and these individual adaptors are configured at agent installation time.

The test compartment validates if load generator is configured or not. If the load generator is configured then, it activates the performance test, accesses controls, schedules test runs and manages the test data as described in FIG. 1.

Once, the user uploads the performance scripts and scenario for the project, the project test scheduler along with the project tracker 36 schedules, tracks and runs the test. After every test run, all the components of the system create the test data.

Some of the test data is transferred to open source database such as MySQL, whereas some of the test data i.e. log files 37 is stored in the 'file store repository' managed by the repository of the automated system.

The load generators collects the test artifacts in the form of scripts, scenarios, component generated data from the software agent and transfers it to the server using TCP/IP socket in real time through the component-specific adaptor.

The automated system then, analyses these logs in the form of test artifacts using log analyzer 39 and generates an integrated test report 39 for performance testing. Once all the data from all the components have been transferred to the server, the agent is freely made available for the next run.

Figure 3:
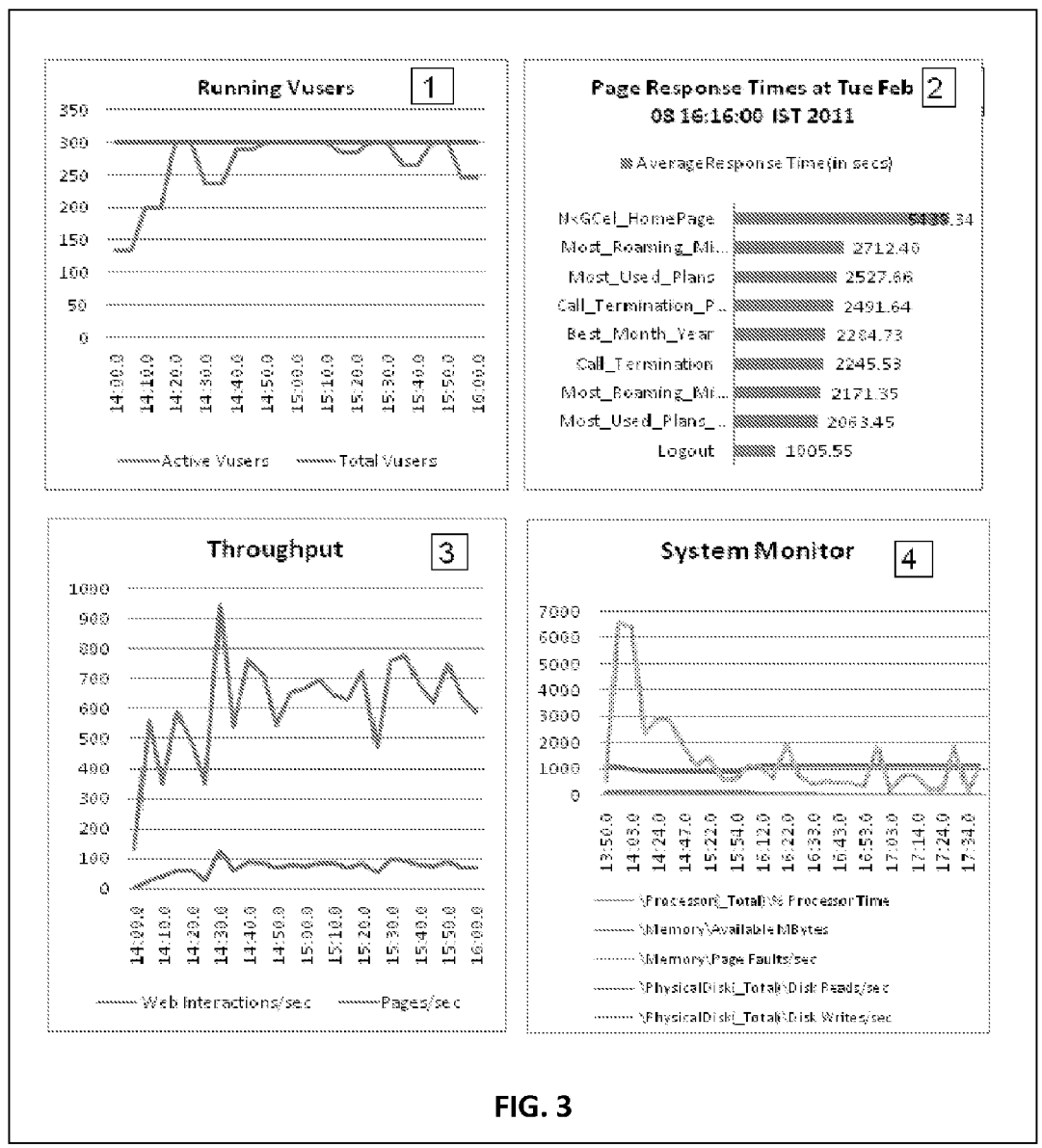
FIG. 3 of the present invention illustrates the graphical user interface of real-time test monitor for the results of the health of a test run of an application.

The automated system provides health of a test run in real time through real time test monitors 20, by depicting 4 things viz. workload or run v. users, response times, and throughput and resource utilization as described in FIG. 3.

FIG. 3 of the present invention illustrates the graphical user interface of real-time test monitor for the results of the health of a test run of an application.

In a preferred embodiment of the present invention, workload 1 refers to the number of users accessing the application. The line graph for workload 1 as depicted in FIG. 3 discloses the virtual user related information. The line graph comprises of two series distinguished with colors; wherein one series indicates the total number of virtual users specified for the test and the other series indicates the number of virtual users who have reported a data point in last few seconds. Thereby, the workload 1 provides a track of the workload on the system at a given time.

In another preferred embodiment of the present invention, response time 2 is the time taken between the user making a request and receiving a response. This helps in identifying the responsiveness of the application. The bar graph for response time 2 as depicted in FIG. 3 indicates the top 10 time taking pages being accessed within the application under test based on their response times measured in seconds. The bar graph for response time 2 is plotted in real-time and displays the instantaneous top 10 slow running page in an application and thereby a track is kept for the bottleneck pages at different points in a given time.

In a further preferred embodiment of the present invention, resource utilization 4 monitoring identifies the demand on a particular hardware or software resource. Further, the hardware resource utilization monitoring of the system of the present invention comprises of monitoring central processing unit, memory and network. The graph as depicted in FIG. 3 for system resource utilization 4 provides the details for the different systems being monitored. The system utilization data is collected through the use of sar on Unix platforms and typeperf utilities on Windows. In this quadrant the user is allowed to select systems she/he wants to monitor.

In a further preferred embodiment of the present invention, throughput 3 is measured in terms transactions per unit time. The graph for throughput 3 as depicted in FIG. 3 comprises of two series displaying the pages/sec and the Web Interactions/sec related information.

Basically, the system supported load generator treats each page to be a set of components, for instance, a page may comprise of a style sheet, various images on the page, servlets, etc. hence the two series, namely pages/sec indicating the throughput for pages and the Web interactions/sec indicates the throughput for the components. Thus the user can check whether the application is performing as per the requirements under the specified workload and thereby the real-time test monitor provides the user with real-time details for the test in progress.

An example of an embodiment of this invention is as follows. Automated performance testing using the system of the present invention in a dynamic production environment for Top 10 quizzes application.

A top 10 quiz application was used to invite registrations and serve quizzes to registered participants. This web application was hosted on Ultimatix and was open to the users. For every language rollout it receives 5000+ registrations. 200 users are concurrent at any point in time during this rollout. Since newer and newer quizzes get added every month it was necessary to keep a tight check on application performance. Hence before every new rollout a performance test was conducted internally in the static test environment using the system of the present invention in a dynamic production environment for Top 10 quiz application.

Two very important requirements of performance testing for Top 10 application were that (1) It should incur zero licensing cost, and (2) It should finish in less than 3 days.

Figure 4:
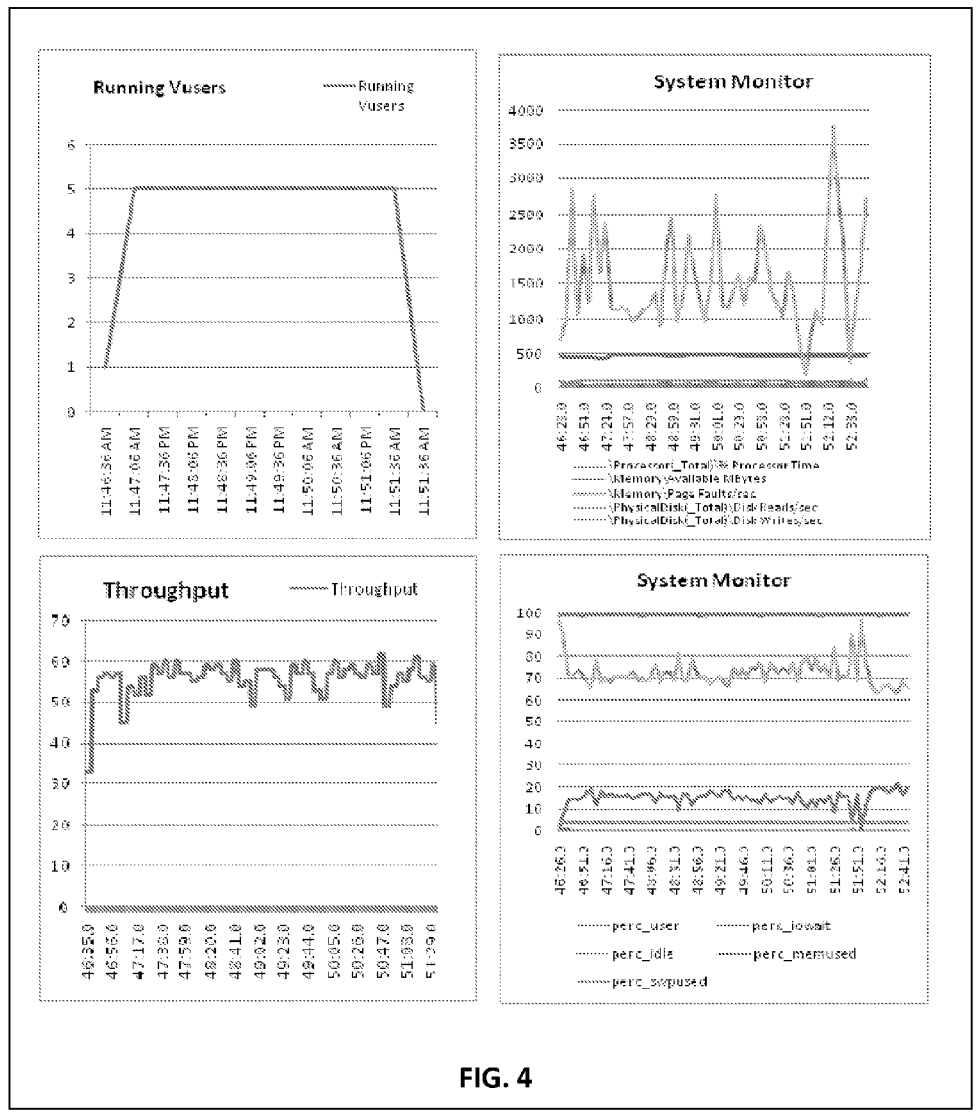
FIG. 4 of the present invention illustrates the graphical user interface of real-time test monitor for the results of the health of a test run for top 10 quiz application.

A test performance script was recorded for an application in Python language and pooled and correlated for parameterizing it with test data. In about 4 hours time the test performance script was ready for use. Further, a scenario was configured using the web interface and system supported load generators to simulate a workload of 200 users "Taking Top 10 Quiz". The test was monitored using Real-time Test Monitor of the system of the present invention. The graphical user interface for the same is depicted in FIG. 4.

The system of the present invention provided the ability to detect the bottleneck tier by means of Transaction profiler and deep-dive into Java metrics by means of java profiler.

Figure 6:
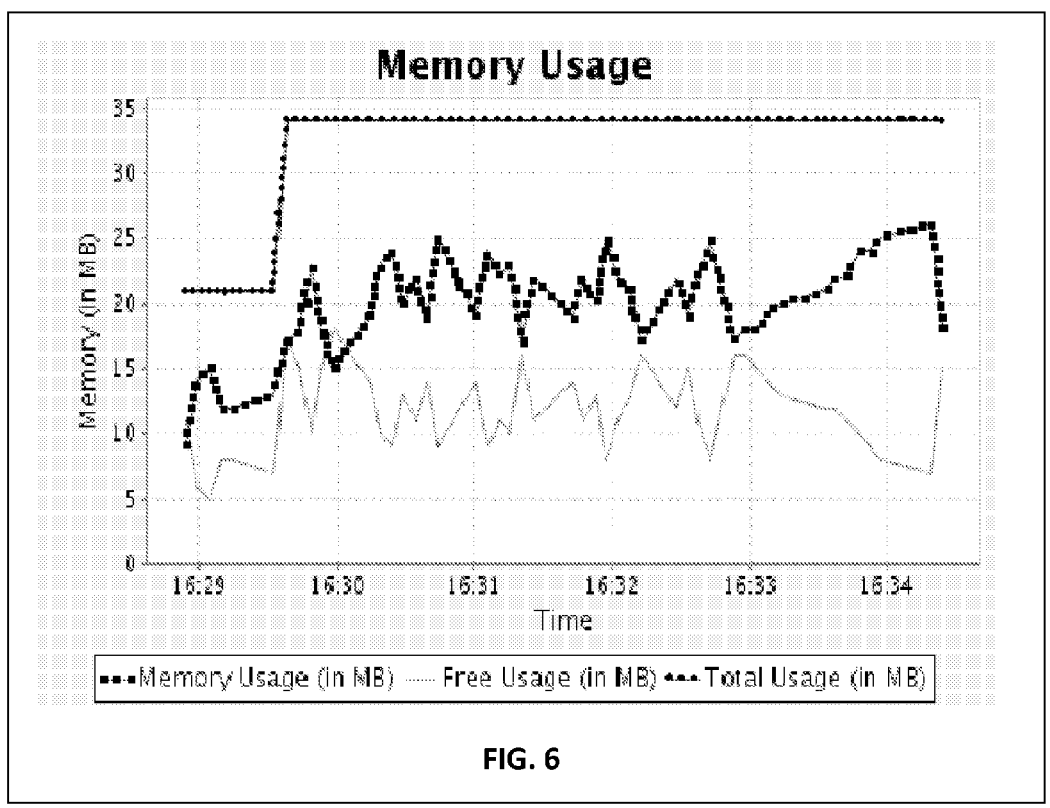
FIG. 6 of the present invention illustrates the comprehensive test report data generated by the system of the present invention for java profiler for top 10 quiz application.
Figure 7:
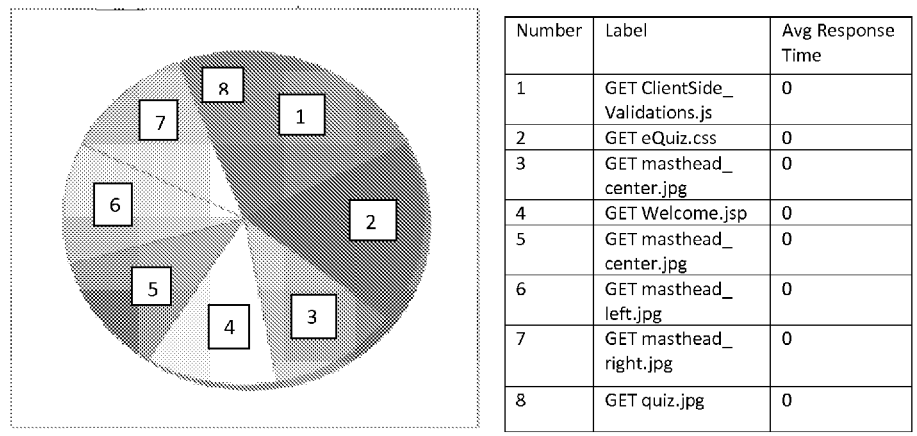
FIG. 7 of the present invention illustrates the comprehensive test report data generated by the system of the present invention for system supported load generators for top 10 quiz application.

A comprehensive test report was generated in minutes after the test was completed with data for components such as transaction profiler (as depicted in FIG. 5), java profiler (as depicted in FIG. 6) and system supported load generator (as depicted in FIG. 7). Instant availability of data from all tiers in form of the Test Report enabled to detect and eliminate bottlenecks in code in one working day.

Another example of an embodiment of this invention is as follows. Load or performance testing for a tax processing application, accessed by 4000 users was performed using the system of the present invention with the application of Little's law.

Table 1: shows results from the load testing of a tax processing application accessed by 4000 users.

TABLE 1

| N | R (sec) | Z (sec) | X (tps) | $X^* = N/(R + Z)$ (tps) | Error $(X^* - X)/X$ |
|---|---------|---------|---------|--------------------------|---------------------|
| 1000 | 1.00 | 39 | 25 | 25.0 | 0% |
| 2000 | 1.10 | 39 | 48 | 49.9 | 4% |
| 4000 | 40.50 | 39 | 48 | 50.3 | 5% |

The second to last column in Table 1 refers to the estimated throughput that was obtained on application of Little's Law in the system of the present invention, in order to get the throughput as a function of N, R, and Z. The result obtained is compared against the actual throughput obtained during the test; the comparison shows that the results are within a 5% error range, which is acceptable.

Yet another example of an embodiment of this invention is as follows. Load testing for a tax processing application accessed with a significant increase in the number of users i.e. from 2000 to 4000 users. A significant jump in response time was observed when going from N=2000 users to N=4000 users. A lot of money was spent for procuring load testing user licenses and had initially done a lot of tests with N=500 users at a lower licensing price. The real life requirement was to meet acceptable response times (R<10 sec) at N=4000 and Z=39 seconds.

Table 2 shows the performance results (R and X) obtained for three different workload (N and Z) conditions for a tax processing application using the system of the present invention.

TABLE 2

| R (sec) | 7 | 1.1 | 40.5 |
|---------|---|-----|------|

At N=500, initially Z was set to 0 but the application crashed and hence Z was slightly increased to observe more stable behavior. It can be observed from the table 2 results obtained after performing load test that the throughput has saturated at around X=50 with a marginal decrease as N is increased to 4000.

Further, the system of the present invention was used to perform load testing for the same under saturation. It is observed that the results obtained using the system of the present invention, without running the tests for higher values of N were similar. More specifically, if we set Xmax=50 and use equation (2) under saturation we would get:

For N=2000, Z=39: R=1.0 sec
For N=4000, Z=39: R=41.0 sec

The above obtained results match the results of Table 2. Even if one is not sure whether the given values of N and Z would result in a bottleneck, one could use the extrapolation results as lower bounds.

The team spent a number of days trying to figure out why the response time jumped from 1.1 sec to 40.5 sec when N was doubled from 2000 to 4000, and they thought that there was either an error in test execution or something that was wrongly tuned at N=4000.

N=500
Z=3 sec
N=2000
Z=39 sec
N=4000
Z=39 sec
X (tps) 50 48 48
R (sec) 7 1.1 40.5

Hence, extrapolation analysis provided by the system of the present invention for load testing is time efficient and cost efficient.

Thus, some of the advantages of the proposed computer implemented software performance testing are as follows:

The present invention provides a system and method for automated performance testing in a dynamic production environment.

The system of the present invention transforms the static test environment into dynamic production environment predicts accurate results over a constantly changing application.

The system of the present invention is scalable, pluggable and enhances productivity, improvises the quality of testing and is cost effective.

The system of the present invention obtains quantitative measurements over conventional production using profilers.

The system of the present invention leverages the strengths of conventional testing by making use of existing load generator tools.

The system provides web enablement and collaborative approach, which makes sharing of hardware and software resources simple and easy.

The system of the present invention reduces the test window, strengthens the project management.

The preceding description has been presented with reference to various embodiments of the invention. Persons skilled in the art and technology to which this invention pertains will appreciate that alterations and changes in the described process and methods of operation, use of the software and hardware other than those described can be practiced without meaningfully departing from the principle, spirit and scope of this invention.

We claim:

1. A system having a scalable and pluggable framework for automated performance testing of an enterprise application, the system comprising:
    an agent coupled to a framework;
    a plurality of interconnected components communicatively coupled to the agent, the interconnected components comprising a plurality of load generators, an emulator, and a profiler; and
    a server with a processor that executes instructions stored in memory to perform operations, the server communicatively coupled to a repository, a scheduler, a system modeling tool, a system resource utilization monitor, a run-time duration module, a real-time test monitor, and a reporting engine;
        wherein the a plurality of load generators record and enhance a test script for running the test script on the enterprise application, wherein the test script is enhanced by providing wrappers around the test script;
        wherein the operations comprise detecting a network packet bottleneck based upon the test script run on the enterprise application;
        wherein the operations further comprise measuring a response time and utilization statistics of the enterprise application;
        wherein the real-time test monitor monitors network activity based upon the network packet bottleneck, the response time, and the utilization statistics;
        wherein the system modeling tool extrapolates network activity data from a static test environment to a dynamic production environment;
        wherein the load generator, the emulator, and the profiler validate the network activity data; and
        wherein the reporting engine generates a performance output parameter based upon the network activity data.

2. The system of claim 1, wherein the emulator is selected from a group consisting of a WAN emulator and a database production emulator.

3. The system of claim 2, wherein the WAN emulator captures network characteristics, the network characteristics selected from a group consisting of bandwidth, latency, packet loss, jitter and connection losses.

4. The system of claim 2, wherein the database production emulator is integrated within a control level and a data layer in the framework.

5. The system of claim 1, wherein the profiler is selected from a group consisting of a Java profiler and a transaction profiler.

6. The system of claim 5, wherein the transaction profiler analyzes network packets, and identifies network packet bottlenecks.

7. The system of claim 5, wherein the Java profiler collects data at a with overheads of 2 microseconds to 5 microseconds.

8. The system of claim 1, wherein the agent includes a plurality of adapters, wherein each adapter operates on a different server.

9. The system of claim 1, wherein the repository stores inventory and mapping information.

10. The system of claim 1, wherein the reporting outputs data related to a response time, a throughput, a runtime duration, or a memory usage.

11. A method for enabling automated performance testing of an enterprise application by employing a system having a scalable and pluggable framework, the method comprising the steps of:
    recording and enhancing a test script using a plurality of load generators for running the test script on the enterprise application, wherein the enhancing comprises providing wrappers around the test script;
    extrapolating network activity data from a static test environment to a dynamic production environment using a system modeling tool;
    detecting a network packet bottleneck based upon the test script run on the enterprise application;
    measuring a response time and utilization statistics of the enterprise application;
    monitoring network activity based upon the network packet bottleneck, the response time, and the utilization statistics;
    validating network activity data using at least one of a load generator, an emulator, and a profiler;
    generating a performance output parameter using a reporting engine based upon the network activity data;
    retrieving the performance output parameter from the reporting engine using an agent; and
    transmitting the performance output parameter from the agent to a server via the network.

12. The method of claim 11, wherein the load generator is integrated into the framework using a wrapper.

13. The method of claim 11, wherein the emulator is selected from a group consisting of a WAN emulator and a database production emulator.

14. The method of claim 13, further comprising the step of enforcing network characteristics using the WAN emulator.

15. The method of claim 14, wherein the network activity is a function of enforced network characteristics.

16. The method of claim 13, further comprising the step of predicting a query performance for a future volume using the database production emulator.

* * * * *